United States Patent
Gillett et al.

(10) Patent No.: US 11,776,560 B1
(45) Date of Patent: Oct. 3, 2023

(54) PROCESSING MULTIPLE INTENTS FROM AN AUDIO STREAM IN A VIRTUAL REALITY APPLICATION

(71) Applicant: Health Scholars Inc., Westminster, CO (US)

(72) Inventors: Brian Philip Gillett, Boulder, CO (US); Akmal Hisyam Idris, Westminster, CO (US); James Oliver Lussier, Denver, CO (US); Dustin Richard Parham, Arvada, CO (US); Kit Lee Burgess, Brighton, CO (US)

(73) Assignee: Health Scholars Inc., Westminster, CO (US)

( * ) Notice: Subject to any disclaimer, the term of this patent is extended or adjusted under 35 U.S.C. 154(b) by 0 days.

(21) Appl. No.: 17/965,720

(22) Filed: Oct. 13, 2022

(51) Int. Cl.
*G10L 25/51* (2013.01)
*G10L 15/08* (2006.01)
*G06F 3/01* (2006.01)
*G10L 15/04* (2013.01)

(52) U.S. Cl.
CPC ............. *G10L 25/51* (2013.01); *G06F 3/011* (2013.01); *G10L 15/04* (2013.01); *G10L 15/08* (2013.01); *G10L 2015/088* (2013.01)

(58) Field of Classification Search
CPC ......... G10L 25/51; G10L 15/04; G10L 15/08; G10L 2015/088; G06F 3/011
See application file for complete search history.

(56) References Cited

U.S. PATENT DOCUMENTS

| | | | |
|---|---|---|---|
| 6,154,723 A | 11/2000 | Cox et al. | |
| 10,353,474 B2 | 7/2019 | Sharma et al. | |
| 10,403,285 B1* | 9/2019 | Gleason | G10L 15/26 |
| 11,501,770 B2* | 11/2022 | Chun | G10L 15/22 |
| 2016/0148610 A1* | 5/2016 | Kennewick, Jr. | G10L 15/18 704/240 |
| 2018/0293974 A1* | 10/2018 | Georges | G10L 15/183 |
| 2019/0278562 A1* | 9/2019 | Tang | G10L 15/02 |
| 2020/0330856 A1 | 10/2020 | Akemann et al. | |
| 2021/0249006 A1 | 8/2021 | Bromand | |
| 2022/0180888 A1 | 6/2022 | Karri et al. | |

* cited by examiner

*Primary Examiner* — Abul K Azad
(74) *Attorney, Agent, or Firm* — Ramya Possett

(57) ABSTRACT

A method for processing multiple intents from an audio stream in a virtual reality application may include multiple steps, including: receiving a stream of words as a first utterance; processing the first utterance before the stream of words is fully received; based on the processing, determining a first intent from the first utterance before the stream of words is fully received; determining occurrence of a pause after the first utterance; and receiving a second stream of words as a second utterance, the second stream being received after the determined pause.

20 Claims, 3 Drawing Sheets

Fig. 2A
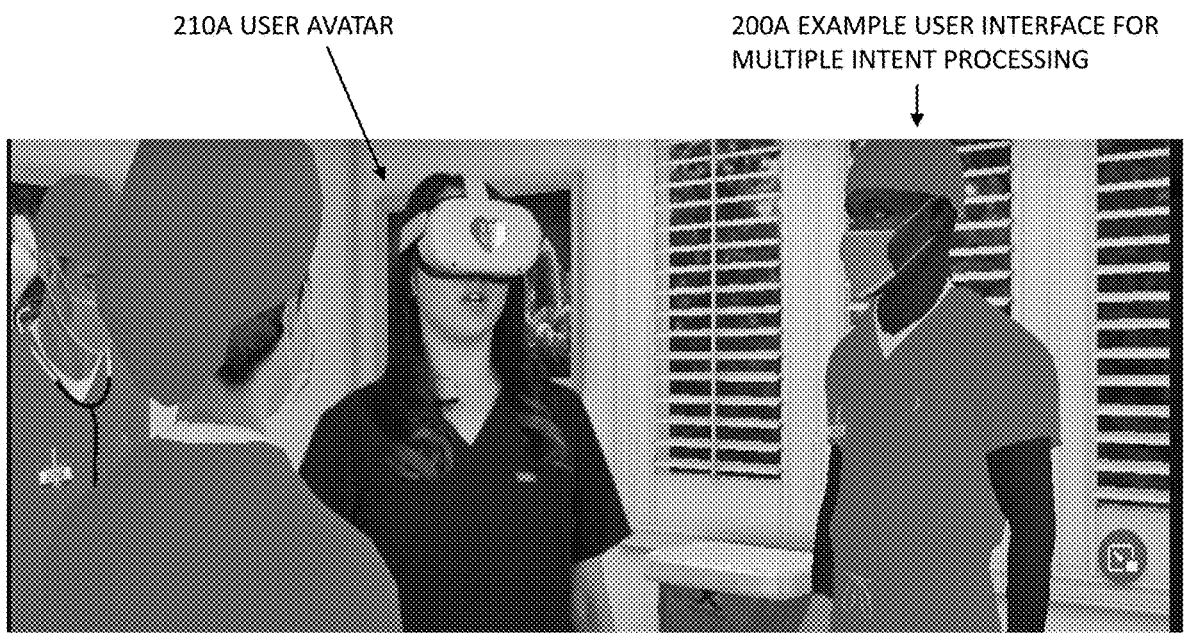
210A USER AVATAR
200A EXAMPLE USER INTERFACE FOR MULTIPLE INTENT PROCESSING
210B USER AVATAR
200B EXAMPLE USER INTERFACE FOR MULTIPLE INTENT PROCESSING
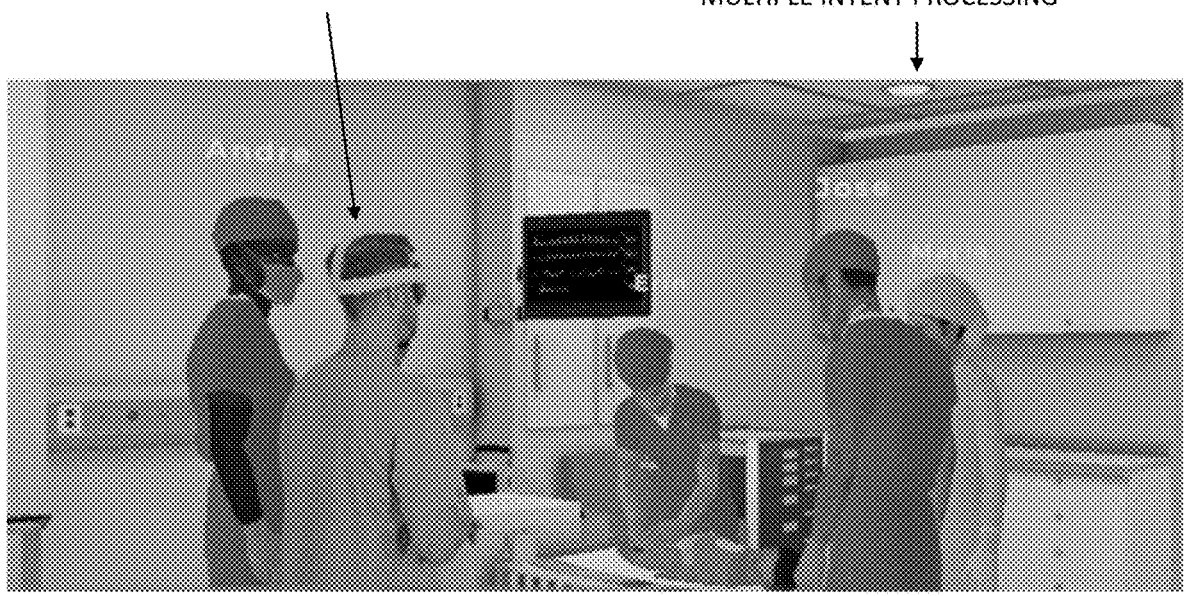
Fig. 2B

PROCESSING MULTIPLE INTENTS FROM AN AUDIO STREAM IN A VIRTUAL REALITY APPLICATION

BACKGROUND

Providing training for human-centered tasks via a virtual reality application can be daunting. Enabling a virtual reality application to interact and respond to a user in a more realistic, human way can be incredibly difficult.

BRIEF DESCRIPTION OF THE DRAWINGS

The following detailed description references the drawings, wherein:

FIG. 2A is a diagram depicting an example user interface for multiple intent processing.

FIG. 2B is a diagram depicting an example user interface for multiple intent processing.

DETAILED DESCRIPTION

Figure 1:
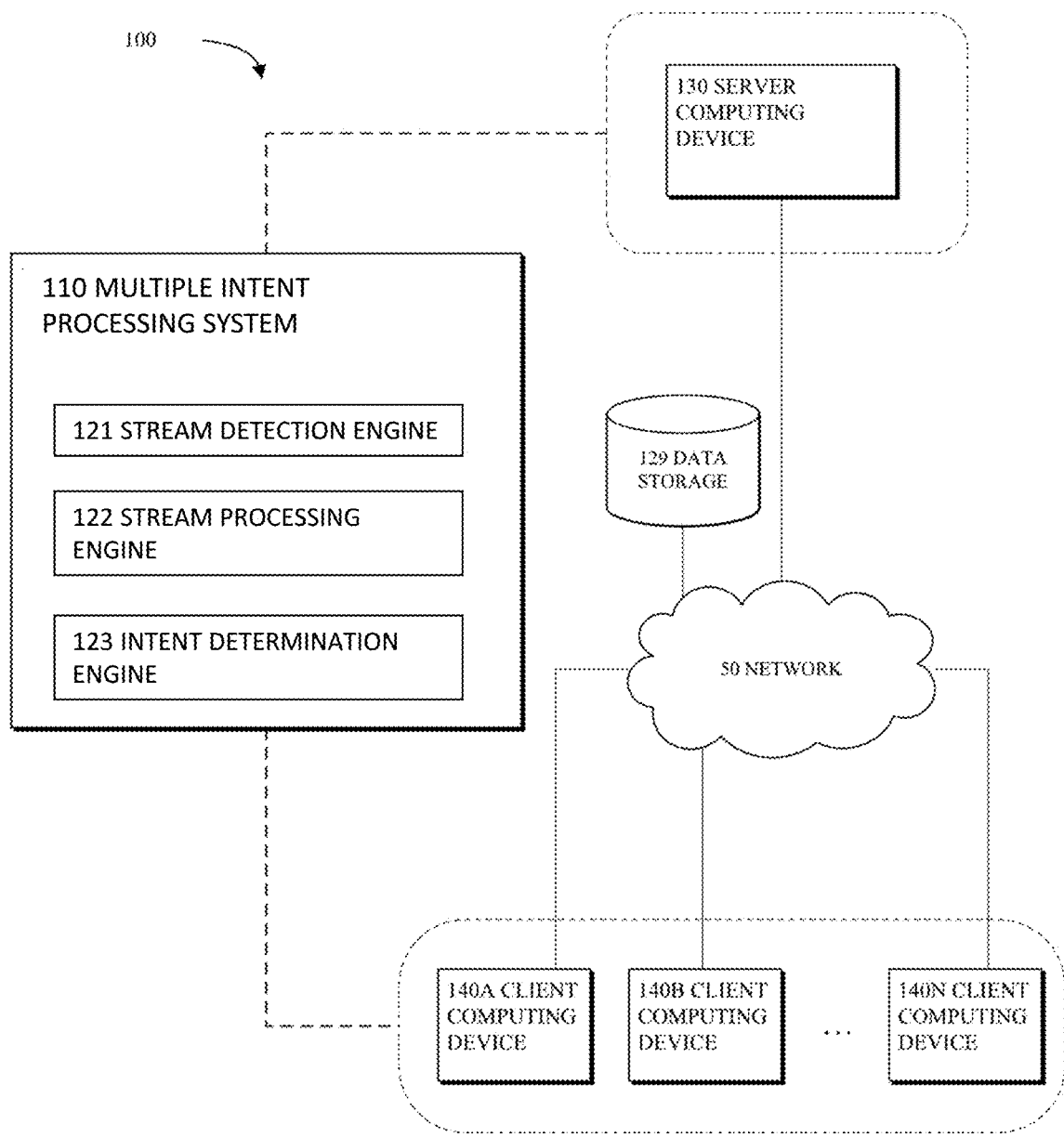
FIG. 1 is a block diagram depicting an example environment in which various examples may be implemented as a multiple intent processing system.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

Providing training for human-centered tasks via a virtual reality application can be daunting. Enabling a virtual reality application to interact and respond to a user in a more realistic, human way can be incredibly difficult.

In one example, a virtual reality application may be used to train a user to perform tasks in a real-time setting. Being able to interact with the user with situational awareness in real-time is crucial, to train the user on how to react in that situation. In particular, being able to interact with a user based on their real-time voice responses to a situation being provided by the virtual reality application can be incredibly difficult. Unlike a computer, a user may not speak in a methodical or logical way, with one response presented at a time. Further, the user may need training not just on the correct actions to perform based on the situational context for task competency, but may also need to gain soft skills via the interaction as well. Deciphering a user's response in a situational context and determining the correct set of responses for that user is not a simple or intuitive task, even for a person, let alone a software application. One large hurdle to this task is determining and processing multiple intents by the user in a single audio stream received from the user.

The technology described herein solves these issues. In particular, the technology described herein processes multiple intents from an audio stream received from a user of a virtual reality application, to enable more real-time and realistic responses from the virtual reality application, including providing multiple actions or responses to a single audio stream that includes multiple intents.

Some examples disclosed herein to process multiple intents from an audio stream in a virtual reality application enable receiving a stream of words as a first utterance; processing the first utterance before the stream of words is fully received; based on the processing, determining a first intent from the first utterance before the stream of words is fully received; determining occurrence of a pause after the first utterance; and receiving a second stream of words as a second utterance, the second stream being received after the determined pause.

Some of the examples disclosed herein to process multiple intents from an audio stream in a virtual reality application are enabled by a non-transitory machine-readable storage medium comprising instructions executable by a physical processor of a computing device for processing multiple intents from an audio stream in a virtual reality application. The machine-readable storage medium includes: to receive a stream of words as a first utterance; instructions to process the first utterance before the stream of words is fully received; instructions to determine, based on the processing, a first intent from the first utterance before the stream of words is fully received; instructions to determine occurrence of a pause after the first utterance; and instructions to receive a second stream of words as a second utterance, the second stream being received after the determined pause.

Some of the examples disclosed herein to process multiple intents from an audio stream in a virtual reality application include a virtual realty system enabled to: receive a stream of words as a first utterance; process the first utterance before the stream of words is fully received; determine, based on the processing, a first intent from the first utterance before the stream of words is fully received; determine occurrence of a pause after the first utterance; and receive a second stream of words as a second utterance, the second stream being received after the determined pause.

The terminology used herein is for the purpose of describing particular embodiments only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

FIG. 1 is an example environment 100 in which various examples may be implemented as a multiple intent processing system 110. In some examples, environment 100 may include various components including server computing device 130 and client computing devices 140 (illustrated as 140A, 140B, . . . , 140N). Each client computing device 140A, 140B, . . . , 140N may communicate requests to and/or receive responses from server computing device 130. Server computing device 130 may receive and/or respond to requests from client computing devices 140. While server computing device 130 is depicted as a single computing device, server computing device 130 may include any number of integrated or distributed computing devices serving at least one software application for consumption by client computing devices 140. In particular, server computing device 130 may be a virtual reality system comprising a physical processor that enables the functionality described herein.

Client computing devices 140 may be any type of computing device providing a user interface through which a user can interact with a software application. For example, client computing devices 140 may include a laptop computing device, a desktop computing device, an all-in-one computing device, a thin client, a workstation, a tablet computing device, a mobile phone, an electronic book reader, a network-enabled appliance such as a "Smart" television, a virtual reality headset, and/or other electronic device suitable for displaying a user interface and processing user interactions with the displayed interface. In some examples, client computing devices 140 may include a virtual reality headset, a microphone, and/or other hardware components that enable interaction with a virtual reality application.

Data store 129 can be any non-transitory machine-readable storage. In some examples, data store 129 can comprise an Solid State Drive (SSD), Hard Disk Drive (HDD), a database, a networked database storage system, a cloud storage, and/or other type of data store that stores information related to multiple intent processing system 110.

The various components (e.g., components 129, 130, and/or 140) depicted in FIG. 1 may be coupled to at least one other component via a network 50. Network 50 may comprise any infrastructure or combination of infrastructures that enable electronic communication between the components. For example, network 50 may include at least one of the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network.

According to various implementations, multiple intent processing system 110 and the various components described herein may be implemented in hardware and/or a combination of hardware and programming that configures hardware. Furthermore, in FIG. 1 and other Figures described herein, different numbers of components or entities than depicted may be used.

Multiple intent processing system 110 may comprise a stream detecting engine 121, a stream processing engine 122, an intent determination engine 123, and/or other engines. The term "engine", as used herein, refers to a combination of hardware and programming that performs a designated function. As is illustrated respect to FIGS. 3-4, the hardware of each engine, for example, may include one or both of a processor and a machine-readable storage medium, while the programming is instructions or code stored on the machine-readable storage medium and executable by the processor to perform the designated function.

Stream detecting engine 121 may receive a stream of words as a first utterance in a virtual reality application running on server 130. For example, stream detecting engine 121 may receive the stream of words from a user via a computing device 140n (e.g., via a microphone, headset, or other hardware component capable of providing audio data). In some examples, the stream detecting engine 121 may comprise an active listener that listens for audio data from computing device 140n. In some of these examples, the stream detecting engine 121 may receive the stream of words as a first utterance without needing to rely on a trigger word to activate the active listener. The active listener may be constantly on, or may be activated based on a state of the virtual reality application.

In some examples, an utterance, like the first utterance, may comprise a set of consecutive words received until a pause is detected. An utterance may include one or multiple complete sentences, a set of unrelated words, stuttering, silences that are of a length less than a predetermined threshold that indicates a pause, nonsense words, one or multiple phrases, and/or one or multiple combinations of these examples.

A state of the virtual reality application may comprise, for example, data related to a context in which an application is running at a specific moment in time. That context may include global and static variables, the data stored in memory, and a set of next states that the application could move to in response to being at the existing state. In some examples, the state of virtual reality application may be considered a full snapshot of the application at a moment in time. The virtual reality application could move from one set to the next state based on predetermined algorithms of the virtual reality application, based on internal or external inputs, and/or based on other factors that affect a change in state of the virtual reality application.

Stream detecting engine 121 may receive the stream of words in response to a prompt provided by the virtual reality application. In another example, stream detecting engine 121 may receive the stream of words after initiation of the virtual reality application. The stream detecting engine 121 may receive the stream of words in other examples as well, such as an unprompted stream of words from a user computing device 140n, in response to a situation provided by the virtual reality application, in response to a visual indication that an audio response is requested by the virtual reality application, in response to a current state of the virtual reality application, and/or in other ways.

In some examples, the stream may include noise. This noise may be background noise picked up via the user's computing device 140n, and/or other non-verbal sound. In some examples, the noise may be user audio from a second user that is not the user of the computing device 140n. For example, the user of the computing device 140n and the second user may be in the same room, the second user may be engaging in the virtual reality application using a second computing device 140a in the same room, the second user may be an individual training the user of the computing device 140n on how to use the virtual reality application, and/or may otherwise be co-located with the user of the computing device 140n. The stream detecting engine 121 may determine that the audio data received from the second user does not match the audio data received from the user of the computing device 140n and may consider the audio data received from the second user as noise. For example, the stream detecting engine 121 may process the received audio data from the user of the computing device 140n to determine statistics, patterns, and/or other characteristics to isolate audio data related to the audio data from the user of computing device 140n from other audio data in the stream.

In these examples, the stream detecting engine 121 may determine that one or multiple portions of the received stream is noise and may exclude the audio portion considered to be noise for processing the stream.

The stream detecting engine 121 may also determine occurrence of a pause after the first utterance, and may determine a second or multiple further streams of words after the determined pause. For example, stream detecting engine 121 may determine occurrence of a pause based on a predetermined amount of time elapsing before any audio is received via computing device 140*n*. In some of these examples, the stream detecting engine 121 may determine that audio is being received based on a decibel level of sound data being received via the computing device 140*n*. In some of these examples, stream detecting engine 121 may determine the predetermined amount of time based on repeated interaction between the user of computing device 140*n* and the virtual reality application. In some of these examples, the stream detecting engine 121 may consider noise in the audio stream in determining occurrence of a pause. In these examples, the stream detecting engine 121 may maintain a counter on an amount of time elapsed responsive to the audio being considered a noise. The stream detecting engine 121 may determine that a second stream of words is being received after the determined pause and may receive the second stream of words as a second utterance.

In some examples, the stream detecting engine 121 may store input received from the computing device 140*n*. For example, the stream detecting engine 121 may store received audio in a circular buffer which stores a predetermined amount of audio data received from the computing device 140*n*.

Stream processing engine 122 may receive the stored data, including one or multiple utterances, from the stream detecting engine 121 for processing. The stream processing engine 122 may enable transcription and/or other processing of the stored predetermined amount of audio data. In some examples, the stream processing engine 122 may process the stored audio data based on a detected language of the audio data, a state of the virtual reality application, information related to the user of the computing device 140*n* using the virtual reality application, a combination thereof, and/or other factors that could affect determining an intent that may be included in the audio data.

In some examples, stream processing engine 122 may process an utterance from the stream detecting engine 121 before a full stream of words is received (e.g., before a pause is detected by the stream detecting engine 121).

In some examples, the stream processing engine 122 may process an utterance by providing multiple transcriptions. The stream processing engine 122 may provide, for each transcription, a different confidence level indicating a level of confidence that the transcription is an accurate representation of the utterance, a ratio of number of transcribed words to an amount of time associated with the utterance, and/or other factors related to accuracy of representation of the utterance. In some examples, the stream processing engine 122 may use a third-party API or third-party tool for transcription. In some examples, the stream processing engine 122 may create an ordered list of the transcriptions according to the one or multiple factors related to accuracy of the representation of the utterance. The stream processing engine 122 may provide information related to the transcriptions, other processing, and/or the utterances themselves to the intent determination engine 123.

Intent determination engine 123 may determine one or multiple intents from the first utterance. An intent may comprise, for example, an indication of an action or state that the user interacting with the virtual reality application desires. For example, an intent may comprise an action that the user wishes to undertake in the virtual reality application, a response to a question that will move forward a state of the virtual reality application, a question that will elicit additional information to enable the user to further react to the virtual reality application, and/or other interaction that indicates how the user wants to move forward the virtual reality application scenario in which the user resides.

For example, intent determination engine 123 may determine a first or multiple intents from a received first utterance, based on the processing of the stream processing engine 122. In some examples, the intent determination engine 123 may determine the first or multiple intents by matching the processed utterance to a set of predetermined intents associated with the virtual reality application. For example, the intent determination engine 123 may match a phrase in the processed utterance to a set of pre-determined phrases associated with an intent. The intent determination engine 123 may access a set of phrases associated with an intent from storage 129, where an intent may be associated with a word, a phrase, a set of phrases provided in consecutive order, numerical values combined with words (e.g., like a dosage, response to a question with a set of ranges, etc.), a combination thereof, and/or other pre-determined word pattern.

In some examples, the set of phrases associated with an intent may comprise a confirmed word pattern and a set of acceptable word patterns that may each comprise a variation of the confirmed word pattern.

The intent determination engine 123 may match a set of one or multiple words in the processed utterance with the stored set of phrases to determine one or multiple intents. In some of these examples, the intent determination engine 123 may receive multiple processings of an utterance and may match the utterance in real-time with the stored set of phrases to determine the set of intents, may match all of the multiple processings of the utterance to determine a best match of the set of intents, may match the multiple processings in order of confidence, a priority of the intents, ratio of number of transcribed words to amount of time associated with the utterance, or other factors related to accuracy of representation of the utterance, and/or may otherwise consider an order in which the multiple processings are handled.

In some examples where the intent comprises a numerical value, the intent determination engine 123 may enable conversion of the numerical value based on context. For example, responsive to the intent determination engine 123 detecting a numerical value and then a qualifier for the numerical value (e.g., "1.1 grams" or "1100 milligrams"), the intent determination engine 123 may automatically convert the numerical value and qualifier to a set of corresponding numerical qualifier combinations and match the numerical value based on the set of corresponding combinations.

In some examples, the set of intents stored in the data store 129 may be prioritized from high to low, such that selection of one intent is prioritized over another intent if both could be matched by the intent determination engine 123. In some examples, the priority may be indicated by a pre-determined set of priority levels, a distinct priority associated with each intent in the data store, and/or other priority indicator. In some examples, the priority of intents may correspond to a state of the virtual reality application, where the set of intents associated with the state of the virtual reality application may be prioritized. In some examples, the intent determination engine 123 may more heavily weight the matching of an utterance to a set of phrases associated with an intent of higher priority.

In some examples, the set of intents stored in the data store 129 may be categorized. For example, an intent may be categorized into one or multiple categories. The set of phrases associated with a category of intents may share similar characteristics. For example, the set of phrases associated with a category of intents may comprise a similar word pattern (e.g., a numerical value combined with a qualifier, a mention of a non-player character, a consecutive set of phrases, and/or other similar word pattern). In some examples, a category of intents may correspond to a state of the virtual reality application. In some of these examples, responsive to the virtual reality application entering a pre-determined state, the intent determination engine 123 may match based on a category of intents associated with the predetermined state. In some of these examples, the intents within a category of intents may be prioritized as well, and matched accordingly.

In some examples, intent determination engine 123 may not find a match for an intent in an utterance. Responsive to the intent determination engine 123 not finding a match, the intent determination engine 123 may cause the virtual reality application to return an error to the user via the virtual reality application, may repeat the set of actions that prompted the utterance by the user, and/or may otherwise communicate that no intent was received in the utterance. In some of these examples where an intent may be categorized into a specific category of intents, the data store 129 may store intent category-specific responses and the intent determination engine 123 may cause the virtual reality application to provide an intent category-specific response. For example, responsive to an intent being associated with providing a medicine dosage in response to a state of the virtual reality application and responsive to the utterance including a word that is not recognized as a drug by the intent determination engine 123, the intent determination engine 123 may cause the virtual reality application to indicate that the drug in the utterance is incorrect.

In some examples, the set of phrases associated with intents may also be associated with a specific state of the virtual reality application. In some of these examples, the intent determination engine 123 may determine the first intent by determining a state of the virtual reality application at the time the first utterance was received and matching a phrase in the processed first utterance to a set of pre-determined phrases associated with the determined state of the virtual reality application.

In some examples, the set of phrases associated with intents may also be associated with a non-player character of the virtual reality application. In some of these examples, the intent determination engine 123 may determine the first intent by determining whether the first utterance included a name of a non-player character in the virtual reality application and matching a phrase in the processed first utterance to a set of pre-determined phrases associated with the non-player character.

In some examples, the set of phrases associated with intents may be associated with a specific state of the virtual reality application, a non-player character referenced in the set of phrases, or a combination of both. In some of these examples, the intent determination engine 123 may determine the first intent by determining a state of the virtual reality application at the time the first utterance was received, determining whether the first utterance included a name of a non-player character in the virtual reality application, and matching a phrase in the processed first utterance to a set of pre-determined phrases associated with the determined state of the virtual reality application and the non-player character.

In some of these examples, intent determination engine 123 may determine one or multiple intents from the first utterance before the first stream of words is fully received by stream detection engine 121 or fully processed by stream processing engine 122.

In some examples, the intent determination engine 123 may determine multiple intents based on the first utterance. In some of these examples, the intent determination engine 123 may queue all determined intents in the first utterance and may process all determined intents based on a queue order, based on a determined order of importance of each intent in the queue, and/or based on other factors.

In some examples, the intent determination engine 123 may process an intent by determining an action to be performed in response to determining the intent. For example, intent determination engine 123 may process the first intent by determining a first set of actions to be performed and may process a second intent in the first utterance by determining a second set of actions to be performed, where the first and second set of actions may or may not be different. In some examples, a set of actions to be performed may be one or multiple actions.

In some examples, the intent determination engine 123 may determine the first set of actions based on a state of the virtual reality application at the time the first utterance was received (e.g., a first state of the virtual reality application), a current state of the virtual reality application, a state of the user in the virtual reality application, metadata related to the user, and/or other information related to the virtual reality application. In some examples, the intent determination engine 122 may determine a set of actions for an intent to move the virtual reality application from a first state to a next, second state. For example, the intent determination engine 123 may determine the next, second state to move the virtual reality application based on a set of next states associated with the current state of the virtual reality application and a set of intents associated with each of the next states. In some examples, the intent determination engine 123 may determine that the first set of actions has been performed by the user of the computing device 140*n* for the virtual reality application and may advance the virtual reality application to the associated next, second state.

In some of these examples, the intent determination engine 123 may determine the second set of actions after determining that the first set of actions have been performed by the user of the computing device 140*n* in the virtual reality application. In other examples, the intent determination engine 123 may determine one or multiple sets of actions based on queued intents before any user actions are performed.

For example, as shown in FIGS. 2A and 2B, which each comprise separate diagrams depicting an example user interface for multiple intent processing, an avatar for the user (e.g., user avatar 210A in FIG. 2A or user avatar 210B in FIG. 2B) may be interacting with one or multiple non-player characters in a virtual reality application that is designed to train the user of the computing device 140*n* to gain a predetermined set of skills. In the examples depicted in FIGS. 2A and 2B, the user avatar 210A, 210B face different contextual situations and different states of a virtual reality application. As such, the intent determination engine 123 of FIG. 1 may receive process different intents for each user via their user avatar 210A, 210B interaction with the provided virtual reality application.

Returning to FIG. 1, in performing their respective functions, engines 121-123 may access data storage 129 and/or other suitable database(s). Data storage 129 may represent any memory accessible to multiple intent processing system 110 that can be used to store and retrieve data. Data storage 129 and/or other database may comprise random access memory (RAM), read-only memory (ROM), electrically-erasable programmable read-only memory (EEPROM), cache memory, floppy disks, hard disks, optical disks, tapes, solid state drives, flash drives, portable compact disks, and/or other storage media for storing computer-executable instructions and/or data. Multiple intent processing system 110 may access data storage 129 locally or remotely via network 50 or other networks.

In some examples, multiple intent processing system 110 may be represented or connected to a graph database, to enable better relational mapping between received utterances and intents. In these examples, multiple intent processing system 110 may comprise intent processing machine learning that facilitates the better relational mapping. For example, the machine learning may comprise processing that identifies and fixes commonly mistranslated words, considers regional word matching (e.g., a word or phrase that has a same meaning colloquially in another region of the country or world), and/or other processing that enables better identification of intent from a user's utterance.

Data storage 129 may include a database to organize and store data. The database may reside in a single or multiple physical device(s) and in a single or multiple physical location(s). The database may store a plurality of types of data and/or files and associated data or file description, administrative information, or any other data.

Figure 3:
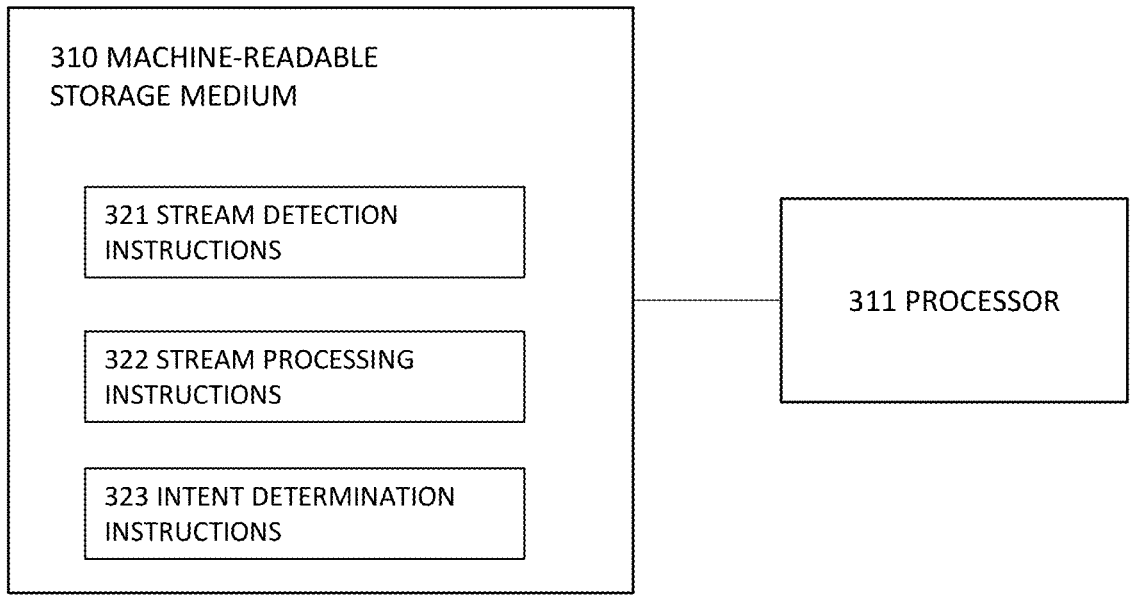
FIG. 3 is a block diagram depicting an example machine-readable storage medium comprising instructions executable by a processor for multiple intent processing.

FIG. 3 is a block diagram depicting an example machine-readable storage medium 310 comprising instructions executable by a processor for processing multiple intents.

In the foregoing discussion, engines 121-123 were described as combinations of hardware and programming. Engines 121-123 may be implemented in a number of fashions. Referring to FIG. 3, the programming may be processor executable instructions 321-323 stored on a machine-readable storage medium 310 and the hardware may include a processor 311 for executing those instructions. Thus, machine-readable storage medium 310 can be said to store program instructions or code that when executed by processor 311 implements multiple intent processing system 110 of FIG. 1.

In FIG. 3, the executable program instructions in machine-readable storage medium 310 are depicted as stream detecting instructions 321, stream processing instructions 322, and intent determination instructions 323. Instructions 321-323 represent program instructions that, when executed, cause processor 311 to implement engines 121-123, respectively.

Machine-readable storage medium 310 may be any electronic, magnetic, optical, or other physical storage device that contains or stores executable instructions. In some implementations, machine-readable storage medium 310 may be a non-transitory storage medium, where the term "non-transitory" does not encompass transitory propagating signals. Machine-readable storage medium 310 may be implemented in a single device or distributed across devices. Likewise, processor 311 may represent any number of processors capable of executing instructions stored by machine-readable storage medium 310. Processor 311 may be integrated in a single device or distributed across devices. Further, machine-readable storage medium 310 may be fully or partially integrated in the same device as processor 311, or it may be separate but accessible to that device and processor 311.

In one example, the program instructions may be part of an installation package that when installed can be executed by processor 311 to implement multiple intent processing system 110. In this case, machine-readable storage medium 310 may be a portable medium such as a floppy disk, CD, DVD, or flash drive or a memory maintained by a server from which the installation package can be downloaded and installed. In another example, the program instructions may be part of an application or applications already installed. Here, machine-readable storage medium 310 may include a hard disk, optical disk, tapes, solid state drives, RAM, ROM, EEPROM, or the like.

Processor 311 may be at least one central processing unit (CPU), microprocessor, and/or other hardware device suitable for retrieval and execution of instructions stored in machine-readable storage medium 310. Processor 311 may fetch, decode, and execute program instructions 321-323, and/or other instructions. As an alternative or in addition to retrieving and executing instructions, processor 311 may include at least one electronic circuit comprising a number of electronic components for performing the functionality of at least one of instructions 321-323, and/or other instructions.

Figure 4:
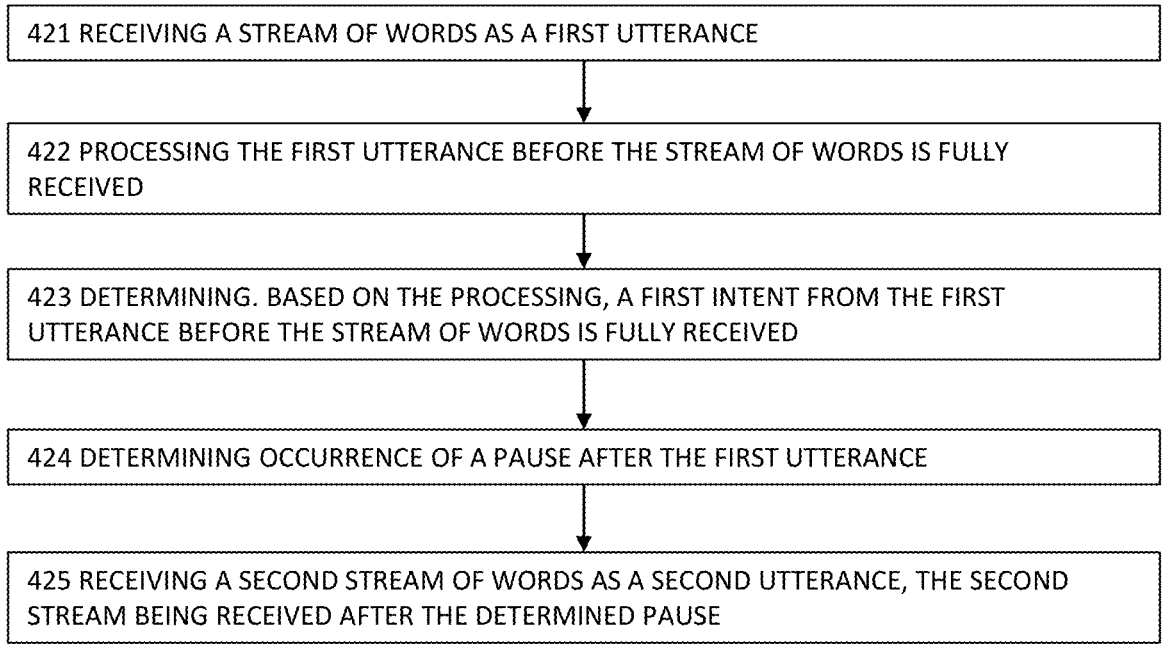
FIG. 4 is a flow diagram depicting an example method for multiple intent processing.

FIG. 4 is a flow diagram depicting an example method 300 for processing multiple intents. The various processing blocks and/or data flows depicted in FIG. 4 (and in the other drawing figures described herein) are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, method 300 as illustrated (and described in greater detail below) is meant to be an example and, as such, should not be viewed as limiting. Method 400 may be implemented in the form of executable instructions stored on a machine-readable storage medium, such as storage medium 310, and/or in the form of electronic circuitry.

In block 421, method 400 may include receiving a stream of words as a first utterance. Referring to FIG. 1, stream detecting engine 121 may be responsible for implementing block 421.

In block 422, method 400 may include processing the first utterance before the stream of words is fully received. Referring to FIG. 1, stream processing engine 122 may be responsible for implementing block 422.

In block 423, method 400 may include, based on the processing, determining a first intent from the first utterance before the stream of words is fully received. Referring to FIG. 1, intent determination engine 123 may be responsible for implementing block 423.

In block 424, method 400 may include determining occurrence of a pause after the first utterance. Referring to FIG. 1, stream detecting engine 121 may be responsible for implementing block 424.

In block 425, method 400 may include receiving a second stream of words as a second utterance, the second stream being received after the determined pause. Referring to FIG. 1, stream processing engine 122 may be responsible for implementing block 425.

The foregoing disclosure describes a number of example implementations for processing multiple intents. The disclosed examples may include systems, devices, computer-readable storage media, and methods for processing multiple intents. For purposes of explanation, certain examples are described with reference to the components illustrated in FIGS. 1-4. The functionality of the illustrated components may overlap, however, and may be present in a fewer or greater number of elements and components.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIG. 4 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

What is claimed is:

1. A method for processing multiple intents from an audio stream in a virtual reality application, the method comprising:
    receiving a stream of words as a first utterance from a first user engaging with the virtual reality application via a first user avatar;
    processing the first utterance before the stream of words is fully received;
    determining a first intent from the first utterance before the stream of words is fully received;
    determining occurrence of a pause after the first utterance;
    receiving a second stream of words as a second utterance, the second stream being received after the determined pause; and
    providing training in the virtual reality application to the first user based on the determined first intent.

2. The method of claim 1, wherein determining the first intent comprises:
    determining a state of the virtual reality application; and
    matching a phrase in the first utterance to a set of pre-determined phrases.

3. The method of claim 1, further comprising:
    determining a second intent in the first utterance before determining the occurrence of the pause.

4. The method of claim 3, further comprising:
    queuing all determined intents in the first utterance, wherein all the determined intents include the first intent and the second intent; and
    processing all determined intents based on a queue order.

5. The method of claim 4, wherein processing all determined intents comprises:
    processing the first intent by: determining a first action to be performed; and
    processing the second intent by: determining a second action to be performed, where the second action is different from the first action.

6. The method of claim 5, wherein determining the first action comprises:
    determining that the first intent was received from the first user; and
    determining, based on a first state of the virtual reality application and a state of the first user, a first next action to advance the virtual reality application for the first user to a second state.

7. The method of claim 6, wherein determining the second action comprises:
    determining that the second intent was received from the first user; and
    determining, based on the first state of the virtual reality application and the state of the first user, a second next action to advance the virtual reality application for the first user to a third state.

8. The method of claim 6, further comprising:
    determining that the first action has been performed by the first user; and
    advancing the virtual reality application to the second state.

9. The method of claim 8, wherein advancing the virtual reality application to the second state occurs after determining the second action has been performed by the first user.

10. A non-transitory machine-readable storage medium comprising instructions executable by a physical processor of a computing device for processing multiple intents from an audio stream in a virtual reality application, the machine-readable storage medium comprising:
    instructions to receive a stream of words as a first utterance from a first user engaging with the virtual reality application via a first user avatar;
    instructions to process the first utterance before the stream of words is fully received;
    instructions to determine a first intent from the first utterance before the stream of words is fully received;
    instructions to determine occurrence of a pause after the first utterance;
    instructions to receive a second stream of words as a second utterance, the second stream being received after the determined pause; and
    instructions to provide training in the virtual reality application to the first user based on the determined first intent.

11. The machine-readable storage medium of claim 10, wherein the instructions to determine the first intent comprises:
    instructions to determine a state of the virtual reality application; and
    instructions to match a phrase in the first utterance to a set of pre-determined phrases.

12. The machine-readable storage medium of claim 10, further comprising:
    instructions to determine a second intent in the first utterance before determining the occurrence of the pause.

13. The machine-readable storage medium of claim 12, further comprising:
    instructions to queue all determined intents in the first utterance, wherein all the determined intents include the first intent and the second intent; and
    instructions to process all determined intents based on a queue order.

14. The machine-readable storage medium of claim 13, further comprising:
    instructions to process the first intent by:
        determining that the first intent was received from the first user; and determining, based on a first state of the virtual reality application and a state of the first user, a set of actions to advance the virtual reality application for the first user to a second state.

15. The machine-readable storage medium of claim 14, further comprising:
    instructions to determine that the set of actions has been performed by the first user; and
    instructions to advance the virtual reality application to the second state.

16. A virtual reality system comprising a physical processor of a computing device for processing multiple intents from an audio stream in a virtual reality application, the physical processor including instructions to:
    receive a stream of words as a first utterance from a first user engaging with the virtual reality application via a first user avatar;
    process the first utterance before the stream of words is fully received;
    determine a first intent from the first utterance before the stream of words is fully received;
    determine occurrence of a pause after the first utterance;
    receive a second stream of words as a second utterance, the second stream being received after the determined pause; and
    provide training in the virtual reality application to the first user based on the determined first intent.

17. The virtual reality system of claim 16, wherein the physical processor further comprises instructions to:
    determine a state of the virtual reality application; and
    match a phrase in the first utterance to a set of pre-determined phrases based on the state of the virtual reality application.

18. The virtual reality system of claim 16, wherein the physical processor further comprises instructions to:
    determine a second intent in the first utterance before determining the occurrence of the pause.

19. The virtual reality system of claim 16, wherein the physical processor further comprises instructions to:
    process the first intent by:
        determining that the first intent was received from the first user; and
        determining, based on a first state of the virtual reality application and a state of the first user, a first next action to advance the virtual reality application for the first user to a second state.

20. The virtual reality system of claim 19, wherein the physical processor further comprises instructions to:
    instructions to determine that the first next action has been performed by the first user; and
    instructions to advance the virtual reality application to the second state.

* * * * *